| United States Patent [19] | [11] 3,926,725 |
|---|---|
| Ishiyama et al. | [45] Dec. 16, 1975 |

[54] PROCESS FOR PRODUCING CYCLIC-3,5-CYTIDYLIC ACID BY FERMENTATION

[75] Inventors: Jiro Ishiyama, Noda; Tamotsu Yokotsuka, Nagareyama, both of Japan

[73] Assignee: Kikkoman Shoyu Co., Ltd., Noda, Japan

[22] Filed: June 7, 1974

[21] Appl. No.: 477,456

[30] Foreign Application Priority Data

June 8, 1973  Japan.......................... 48-63918[U]

[52] U.S. Cl............................................. 195/28 N
[51] Int. Cl.² ........................................ C12D 13/06
[58] Field of Search ................................. 195/28 N

[56] References Cited

UNITED STATES PATENTS

| 3,630,842 | 12/1971 | Ishiyama et al. .................. 195/28 N |
| 3,816,251 | 6/1974 | Nakayama et al. ............... 195/28 N |

*Primary Examiner*—Alvin E. Tanenholtz
*Attorney, Agent, or Firm*—Schuyler, Birch, Swindler, McKie & Beckett

[57] ABSTRACT

Cyclic-3′,5′-cytidylic acid (CCMP) is obtained by culturing in a medium a microorganism belonging to the genus Corynebacterium, Arthrobacter or Microbacterium and having an ability of producing cyclic-3′,5′-cytidylic acid.

The CCMP is important as a reagent for hormone mediator and the like in the field of biochemistry.

17 Claims, No Drawings

PROCESS FOR PRODUCING CYCLIC-3,5-CYTIDYLIC ACID BY FERMENTATION

This invention relates to a process for producing cyclic-3′,5′-cytidylic acid by fermentation. More particularly, the invention is concerned with a process for producing cyclic 3′,5′-cytidylic acid by culturing a microorganism belonging to the genus Corynebacterium, Arthrobacter or Microbacterium.

Cyclic-3′,5′-cytidylic acid (hereinafter referred to as "CCMP") is a substance having the below-mentioned structural formula, and the importance thereof has recently been recognized in the field of biochemistry. CCMP is used as a reagent for hormone mediator and the like, and is quite expensive. Structural formula of CCMP:

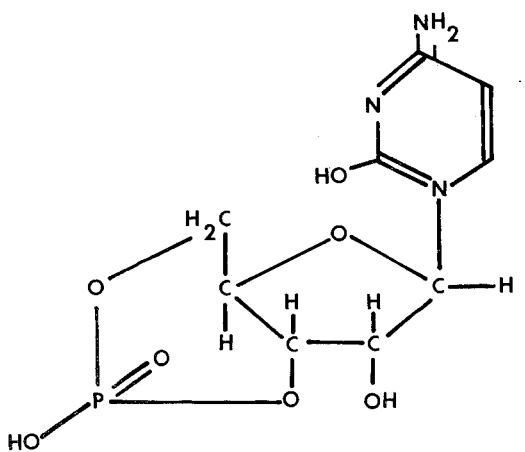

For chemical synthesis of CCMP according to processes known at present, many and complex steps are required. These steps are, for example, cytosine $\xrightarrow{step\ 1}$ benzylcytosine $\xrightarrow{step\ 2}$ benzylcytidine $\xrightarrow{step\ 3}$ benzylcytidine-5′-monophosphate $\xrightarrow{step\ 4}$ cyclic-3′,5′-benzylcytidylic acid $\xrightarrow{step\ 5}$ cyclic-3′,5′-cytidylic acid. [G. M. Blackburn, J. S. Cohen and A. T. Todd, Tetrahedron Letters 39, 2873 (1964); R. K. Borden and M. Smith, J. Org. Chem., 31, 3241, 1966 (1964); G. J. Drummond, M. W. Gilgan, E. J. Reimer and M. Smith, J. Amer. Chem. Soc., 86, 1626 (1964); G. J. Smith, G. J. Drummond and H. G. Khorana, J. Amer. Chem. Soc., 83, 698 (1968); G. M. Tenez, H. G. Khorana, R. Markham and E. H. Pole, J. Amer. Chem. Soc., 80, 6223 (1958)].

During the course of studies on processes for producing CCMP by simpler steps, the present inventors hit on the idea of using microorganisms and further advanced their studies with an aim to find microorganisms suitable for such purpose. As the result, the inventors have succeeded in producing CCMP at one stage by use of such microorganisms as mentioned later and have thus accomplished the present invention.

An object of the present invention is to provide a novel process for producing CCMP by fermentation using microorganisms.

Another object of the invention is to provide a novel process for producing CCMP at low cost on commercial scale.

Other objects and advantages of the invention will become apparent from the explanation given below.

In accordance with the present invention, there is provided a process for producing CCMP by fermentation, characterized by culturing in a medium a microorganism belonging to the genus Corynebacterium, Arthrobacter or Microbacterium and having an ability of producing CCMP, thereby producing and accumulating CCMP in the culture, and then recovering the CCMP from the culture.

Such process for producing CCMP by use of microorganisms has first been established by the present inventors.

As the microorganisms to be used in the process of the present invention, all microorganisms may effectively be used so far as they belong to the genus Corynebacterium, Arthrobacter or Microbacterium and have CCMP-producing ability.

Concrete examples of these microorganisms are Corynebacterium murisepticum No. 7 (ATCC 21374, FERM-P No. 206) and Corynebacterium No. MT-11 (ATCC 31019, FERM-P No. 2384) as the microorganisms belonging to the genus Corynebacterium, Arthrobacter 11 (ATCC 21375, FERM-P No. 207) and Arthrobacter No. MT-12 (ATCC 31020, FERM-P No. 2482) as the microorganisms belonging to the genus Arthrobacter, and Microbacterium No. 205 (ATCC 21376, FERM-P No. 106), Microbacterium No. 205-CM7 (ATCC 21979, FERM-P No. 1557) and Microbacterium No. MT-3 (ATCC 21981, FERM-P No. 787) as the microorganisms belonging to the genus Microbacterium.

Micological properties of the said Corynebacterium murisepticum No. 7, Arthrobacter 11 and Microbacterium No. 205 are disclosed in detail in, for example, U.S. Pat. No. 3,630,842.

The said Microbacterium No. 205-CM7 is a microorganism that was obtained by subjecting Microbacterium No. 205 as a parent strain to such ordinary artificial mutation as mentioned below.

That is, 10 ml of a suspension of spores of Microbacterium No. 205 (number of spores: 2 to 5 x $10^9$/ml) was incorporated and contacted with 0.1 ml of diethyl sulfate under shaking at 30°C for 60 minutes, smeared on an agar plate medium (Note 1) and cultured at 30°C for 48 to 100 hours to develop a colony, and then the resulting mutant was recovered from the colony by screening.

(Note 1): A medium having a composition of 1 % of glucose, 0.5 % of $(NH_4)_2SO_4$, 0.5 % of urea, 1 % of $KH_2PO_4$, 0.3 % of casamino acid, 30 γ/l of biotin, 1 % of $MgSO_4$ and 2 % of agar (pH 7.0) which had been sterilized for 10 minutes under a vapor pressure of 15 lbs/in². (In the above, γ/l represents a weight in 1 liter of the medium, and % represents a weight percentage in 100 ml of the medium; the same shall apply hereinafter.)

Vitamin- and amino acid-requiring properties of the above-mentioned mutant are same as those of the parent strain. (That is, the mutant requires biotin as vitamin, and does not particularly require amino acids but grows well in the presence of asparagine, aspartic acid and arginine).

A mutant having other nutrient-requiring properties than those of the parent strain may, of course, be effectively used in the present process by properly satisfying the nutrient-requiring degrees thereof, so far as the mutant has a CCMP-producing ability.

Further, the said Corynebacterium murisepticum No. 7, Arthrobacter 11 and Microbacterium No. 205 are individually subjected to such diethyl sulfate treatment as mentioned below to obtain $Mn^{++}$ ion-permeable mutants Corynebacterium No. MT-11, Arthrobacter No. MT-12 and Microbacterium No. MT-3, respectively.

That is, 10 ml of a suspension of spores of each of Corynebacterium murisepticum No. 7, Arthrobacter 11 and Microbacterium No. 205 (number of spores: 2 to 5 × 10⁹/ml) is incorporated and contacted with 0.1 ml of diethyl sulfate under shaking at 30°C for 16 hours, added to 300 ml of a medium (Note 2) and subjected to shaking culture at 30°C for additional 16 hours. Subsequently, the cells are recovered, washed with a phosphate buffer (pH 7.0), smeared on the same medium as defined in the aforesaid Note 1, except that the medium has been additionally incorporated with 500 mg/l of $MnCl_2.4H_2O$, and cultured at 30°C for 72 hours to develop colonies. The thus developed colonies were picked up at random on the same medium as defined in the aforesaid Note 1, except that the medium has been incorporated with 500 mg/l of $MnCl_2.4H_2O$, and on the same medium as defined in the aforesaid Note 1, except that the medium has been incorporated with 1 mg/l of $MnCl_2.4H_2O$ and cultured at 30°C for 48 hours, and strains, which have grown in the former medium but not in the latter medium, are isolated. One of the thus isolated strains is each of said Corynebacterium No. MT-11, Arthrobacter No. MT-12 and Microbacterium No. MT-3.

(Note 2): A medium having a composition of 1 % of beef extract, 1 % of polypeptone, 0.5 % of yeast extract and 0.3 % of NaCl (pH 7.0) which has been sterilized for 15 minutes under a vapor pressure of 15 lbs/in².

The colors of the colonies of said Corynebacterium No. MT-11, Arthrobacter No. MT-12 and Microbacterium No. MT-3 are white, and the nutrient-requiring properties of said strains are biotin-requiring, like those of the parent strains.

The above-mentioned Corynebacterium No. MT-11, Arthrobacter No. MT-12 and Microbacterium No. MT-3 are strains which have abilities of producing CCMP even when cultured in a medium incorporated with 0.02 – 500 mg/l of $Mn^{++}$ ions in terms of $MnCl_2.4H_2O$ and/or 10 – 1000 mg/l of $Fe^{++}$ ions in terms of $FeCl_2.7H_2O$, and/or 10 – 1000 mg/l of $Fe^{+++}$ ions in terms of $FeCl_3.7H_2O$, and thus are strains resistant to $Mn^{++}$, $Fe^{++}$ and $Fe^{+++}$ ions (the wording "resistant" means that the strains are left undisturbed by said metal ions not in growth state but in CCMP productivity). When the said strains are used, CCMp can be obtained without lowering the production of CCMP even in a medium comprising natural substances and containing relatively large quantities of $Mn^{++}$, $Fe^{++}$ and $Fe^{+++}$ ions, e.g. a medium comprising city water and high concentrations of meat extract, protein hydrolyzate solution, corn steep liquor, rice bran, molasses, fish solubles, distillers' solubles, etc. and containing one or more of $Mn^{++}$, $Fe^{++}$ and $Fe^{+++}$ ions at concentrations more than those mentioned above.

Furthermore, strains resistant to chemicals such as 5-florouracil and 6-azauracil may also be effectively used in the present process so far as they have abilities of producing CCMP.

Part of the mycological properties of the aforesaid mutants, i.e. Corynebacterium No. MT-11, Arthrobacter No. MT-12, Microbacterium No. 205-CM7 and Microbacterium No. MT-3, are as mentioned previously, and other mycological properties of said mutants are identical with those of their parent strains, i.e. Corynebacterium murisepticum No. 7, Arthrobacter 11 and Microbacterium No. 205.

For the production of CCMP according to the present process, any of the aforesaid strains usable in the present process is inoculated to a medium comprising natural substances or to a synthetic medium prepared by properly blending carbon sources, nitrogen sources and inorganic nutrients capable of being utilized by the said strain, and, if necessary, other inorganic salts and components than these, and is cultured at a pH of 5 to 9 at a temperature of 20° to 40°C for a period until the production of CCMP becomes maximum, e.g. for about 10 to 160 hours.

The production of CCMP is further increased when the medium is incorporated with at least one member selected from the group consisting of cytosine, uracil, orotic acid, ribosides having said compounds as bases (i.e. cytidine, uridine and orotidine), and their ribotides [e.g. 2' (or 3' or 5') -cytidylic acid, cytidine-2' (or 3' or 5') -diphosphate, cytidine-2' (or 3' or 5')-triphosphate, 2' (or 3' or 5')-uridylic acid, uridine-2' (or 3' or 5')-diphosphate, uridine-2' (or 3' or 5')-triphosphate, orotidine-2' (or 3' or 5')-monophosphate, orotidine-2' (or 3' or 5')-diphosphate and orotidine-2' (or 3' or 5')-triphosphate] (hereinafter, these will be referred to as "the cytosine and the like substances").

In case the cultivation according to the present invention is desired to be carried out in the presence of the above-mentioned cytosine and the like substances, the microorganism usable in the present invention is inoculated to, for example, such an ordinary medium as mentioned above and cultured at a pH of 5 to 9 at a temperature of 20° to 40°C for a suitable period, e.g. 6 to 20 hours (this step is referred to as "preculture"). Subsequently, the culture liquor is incorporated with at least one member selected from the group consisting of the cytosine and the like substances, and the cultivation is further continued at a pH of 5 to 9 at a temperature of 20° to 40°C for a period until the amount of CCMP produced becomes maximum, e.g. for 4 to 140 hours (this step is referred to as "post culture"). Alternatively, the microorganism is inoculated to said ordinary medium, which has previously been incorporated with at least one member selected from the group consisting of the cytosine and the like substances, or with a material containing any of the cytosine and the like substances or a fermentation liquid thereof, and then cultured at a pH of 5 to 9 at a temperature of 20° to 40°C for a period until the amount of CCMP produced becomes maximum, e.g. for about 10 to 160 hours. The amount of the cytosine and the like substances to be added to the medium is not particularly limited, but is preferably a concentration of 0.05 to 2 % (W/V), in general.

Examples of preferable carbon sources used in the above-mentioned medium include various carbohydrates such as glucose, fructose, sucrose, maltose, mannose, galactose, ribose, starch, starch hydrolyzate and molasses; various organic acids such as gluconic, pyruvic, lactic and acetic acids; alcohols such as glycerol, sorbitol, inositol and mannitol; and hydrocarbons such as n-paraffin and kerosine.

Examples of preferable nitrogen sources include various inorganic and organic ammonium salts such as ammonia, ammonium chloride, ammonium phosphate, ammonium sulfate, ammonium nitrate, ammonium carbonate and ammonium acetate; nitrogenous organics such as urea, peptone, casein hydrolyzate, meat extract, yeast extract, corn steep liquor, fish meal and their digestives; and amino acids such as alginine, aspartic acid, asparagine, histidine, glutamine, tyrosine, triptophane, cystein and glycine.

Examples of inorganic nutrients include inorganic phosphates such as monopotassium and monosodium phosphates, dipotassium and disodium phosphates, and ammonium phosphate. Examples of inorganic salts other than inorganic phosphates which are added as occasion demands include various metal salts such as magnesium sulfate, magnesium chloride, iron sulfate, iron chloride, zinc sulfate, cobalt sulfate and manganese sulfate; various fluorides such as sodium fluoride, potassium fluoride, calcium fluoride, barium fluoride, ammonium fluoride and zinc fluoride; and boric acid and salts thereof such as ammonium borate, potassium borate, sodium borate and lithium borate.

When the microorganism usable in the present invention is cultured in a medium in the presence of at least one member selected from the group consisting of the above-mentioned fluorides, boric acid and borates, the production of CCMP is further increased. In this case, the amount of said fluorides, boric acid and borates to be added to the medium is preferably 0.1 to 500 mg/l. The fluorides, boric acid and borates may be previously added to the medium or may be added within about 30 hours after initiation of the cultivation.

In addition to the above-mentioned nutrients, vitamins such as biotin, vitamin $B_1$ and $B_2$ and pantothenic acid or related compounds thereof are effectively added as minor components. Pantothenic acid is one member of water-soluble vitamin B group, and the physiological activities thereof coincide with those of coenzyme A (CoA) biosynthesized from pantothenic acid, in general. Accordingly, there may be used such compounds formed during the course of coenzyme biosynthesis as pantothenic acid, $\beta$-alanine, pantethin, pantoic acid, aspartic acid, valine, dimethylpyruvic acid, $\alpha$-ketopantoic acid, pantothenyl cystein, D(+)-4-phosphopantethin, diphosphocoenzyme A and coenzyme A. Alternatively, there may be used derivatives of the said compounds (e.g. $\beta$-alanine-containing carnosine and anserine), and natural substances containing the said compounds (e.g. yeast extract, corn steep liquor, fish soluble, meat extract, rice bran, molasses, liver powder, peptone, NZ-amine and distillers' solubles). In place of vitamin $B_1$, there may be used thiamine-related compounds such as 4-amino-5-aminomethyl-2-methylpyrimidine and 4-methyl-5-$\beta$-hydroxy-ethylthiazole. It is, of course, possible to use natural substances containing these compounds.

The productivity of CCMP increases when caffeine, theophyline, theobromine or the like methylxanthine, or 2,3-, 2,4- or 2,5-pyridinedicarboxylic acid, dipicolinic acid, 8-hydroxyquinoline, polyphosphoric acid or pyrophosphoric acid, which is a growth inhibitor for cyclic 3',5'-nucleotide phosphodiesterase, is previously incorporated into the medium or added during the course of cultivation to a concentration of 500 mg/l.

The cultivation may be carried out according to a proper culture method such as shaking culture, stirring culture or aerobic culture.

During the cultivation, the culture liquor is preferably stirred and aerated so that at the growth stage, the pressure of oxygen present in the culture liquor becomes lower and that of carbon dioxide becomes higher, while at the CCMP production stage, the pressures of said gases become reverse thereto. Concretely, the stirring and aeration are preferably conducted by so establishing the oxygen transfer rate (Kd) and oxygen supplying rate (KGa) of the cultivation tank that at the growth stage (6 to 16 hours after initiation of cultivation), the pressure of oxygen present in the culture liquor is controlled to 0.1 to 0.6 atm. and that of carbon dioxide present therein to less than 0.08 atm., while at the CCMP production stage (16 to 60 hours after initiation of cultivation), the pressure of said oxygen is controlled to 0.2 to 0.8 atm. and that of said carbon dioxide to less than 0.05 atm.

When the amount of CCMP produced has reached the maximum, the cultivation is discontinued, and the CCMP is recovered, if necessary, from the culture, and is purified, if necessary. The recovery of CCMP is carried out according to any of adsorption method and precipitation method, which may be employed either singly or in combination. The adsorption method referred to herein is a method in which the culture liquor freed from the cells, and is contacted with such adsorbent as anion exchange resin, cation exchange resin, active carbon or alumina to adsorb the desired CCMP onto the adsorbent, thereby separating the CCMp from the culture liquor. The precipitation method is a method in which the culture liquor freed from the cells is charged with a non-solvent for CCMP such as a lower alcohol or actone, thereby separating and recovering the CCMP from the culture liquor. When the operational conditions of the above-mentioned methods are properly selected and combined together, the CCMP can be purified. The operational conditions referred to in the above signify the kind of the adsorbent, the composition and concentration of the eluate, etc. in the case of the adsorption method, and signify the kind and amount of the non-solvent for CCMP, the treatment temperature, etc, in the case of the precipitation method.

Several procedures for separation and recovery of CCMp from the culture liquor are described below for illustration.

1. CCMP in the culture liquor freed from the cells by centrifugation or filtration is adsorbed on active carbon, and then eluted with an aqueous ammoniacal alcohol or acetone solution. The eluate is freed from excess ammonia by concentration under reduced pressure, and then contacted with an anion exchange resin (e.g. Dowex 1, chloride type, or Dowex 1, formate type) to adsorb the CCMP on the said resin. Subsequently, the CCMP is eluted with a suitable solvent (e.g. dilute hydrochloric acid or a calcium chloride-dilute hydrochloric acid solvent in the case of Dowex 1, chloride type, and dilute formic acid or a dilute formic acid-sodium formate solvent in the case of Dowex 1, formate type). The resulting eluate is further contacted with active carbon to adsorb the CCMP thereon, which is then eluted with an aqueous ammoniacal alcohol or acetone solution. The eluate thus obtained is freed from excess ammonia by concentration under reduced pressure, adjusted if necessary to a pH of 5 to 10 by addition of 1 – 50 % of sodium hydroxide solution or 1 – 50 % of potassiumhydroxide solution, passed through an alumina column, and then contacted with a cation exchange resin (e.g. Dowex 50, hydrogen type; Amberlite IR 120, hydrogen or sodium type; or Amberlite IRC- 50, hydrogen or sodium type) to adsorb the CCMP on said resin, followed by elution with dilute hydrochloric acid. The thus obtained eluate is concentrated under reduced pressure, and then allowed to stand in a cold chamber or charged with a non-solvent for CCMP such as alcohol or acetone, whereby crystals of the CCMP can be obtained.

2. CCMP in the culture liquor freed from the cells by centrifugation or filtration is adsorbed on an adsorbent such as active carbon, and then eluted with an aqueous ammoniacal alcohol or acetone solution. The eluate is freed from excess ammonia by concentration under reduced pressure, acidified with hydrochloric acid, charged with an organic solvent such as alcohol or acetone, and then allowed to stand in a cold chamber, for example, whereby crude CCMP crystals can be obtained. The thus obtained crude crystals can be purified by use of such anion or cation exchange resin as mentioned above or with alumina. Alternatively, the crude crystals are dissolved in water, acidified with hydrochloric or sulfuric acid, decolored with a decolorizing resin (e.g. Duolite S-30, or Duolite S-10), charged with a non-solvent for CCMP such as alcohol or acetone, and then allowed to stand in, for example, a cold chamber, whereby crystals of the CCMP can be obtained.

3. CCMP in the culture liquor freed from the cells by centrifugation or filtrate is directly adsorbed on an anion or cation exchange resin, and then eluted with a solvent. The resulting eluate is subjected to treatment with alumina, treatment with active carbon and purification with a decolorizing resin, and then allowed to stand in, for example, a cold chamber, whereby crystals of the CCMP can be obtained.

In case the culture liquor contains 3′,5′-cyclic adenylic acid, 2′-nucleotide, 3′-nucleotide and 5′-nucleotide, the culture liquor is subjected, during the course of purification, to adsorption treatment by use of, for example, an ion exchange resin, and then elution operation is effected with suitable selection of the kind of eluting agent, the salt concentration, the acid concentration, etc., whereby CCMP can be separated from said acid and nucleotides.

In case the culture liquor contains 2′-nucleotide, 3′-nucleotide and 5′-nucleotide, the culture liquor is adjusted to pH 5 to 10 and then passed through an alumina column, whereby the said nucleotides can be removed. (Alumina does not adsorb such cyclic-3′,5′-nucleotides as 3′,5′-cyclic adenylic acid and CCMP, but adsorbs 2′-nucleotide, 3′-nucleotide and 5′-nucleotide.)

In the case where the CCMP-containing liquid is subjected to concentration under reduced pressure, it is preferable that the liquid is concentrated after converting the free CCMP into the form of a salt such as Na salt or Ca salt.

The CCMP obtained in the above manner according to the present process coincided in elementary analysis, ribose determination, phosphorus determination, ultraviolet absorption spectrum and infrared absorption spectrum with commercial authentic CCMP obtained according to chemical synthesis.

According to the present process, CCMP, which has heretofore been produced by only a synthesis process requiring many and complex steps, can be obtained by fermentation at one stage and in a short period of time, as mentioned above. Thus, the present process is extremely advantageous as a process for production of CCMP.

The present invention is illustrated in more detail below with reference to examples, but the scope of the invention is not limited to the examples.

In each of the examples, the amount of CCMP produced was determined according to the ion exchange chromatography using Dowex 1 (x 4), formate type resin [R. Berkvist: Acta. Chem. Scan., 10, 1303 (1956)], or to the two dimensional paper chromatography [primary solvent = isobutyric acid : 1N-acetic acid : 1N-ammonia = 10 : 1 : 5 (by volume); secondary solvent = saturated ammonium sulfate solution : 1M sodium acetate solution : isopropyl alcohol = 80 : 20 : 2 (by volume) ].

EXAMPLE 1

Each of the strains set forth in Table 1 was cultured in a slant medium having a composition of 0.5 % of $(NH_4)_2SO_4$, 0.5 % of $KH_2PO_4$, 0.05 % of $MgSO_4.7H_2O$, 1 % of casamino acid, 0.3 % of yeast extract, 1 % of glucose and 2 % of agar to prepare a seed culture. On the other hand, one liter of a medium having a composition of 5 % of glucose, 0.5 % of urea, 1 % of $KH_2PO_4$, 1 % of asparagine, 0.5 % of $MgSO_4.7H_2O$, 200 γ/l of biotin, 0.02 % of calcium pantothenate, 0.002 % of thiamine hydrochloride, 0.01 % of $ZnSO_4.7H_2O$ and 0.00005 % of $Fe_2(SO_4)_3.7H_2O$ (pH 8.0, adjusted by addition of 3N-KOH) was charged into a 5 liter-shaking flask and sterilized in an autoclave at 115°C for 10 minutes. The above-mentioned seed culture inoculated to the medium in the shaking flask, and subjected to shaking culture at 30°C for 70 hours with shaking at 180 r.p.m.

The amount of CCMP produced in each culture liquor at this stage was as shown in Table 1.

Subsequently, each culture liquor was centrifuged to remove the cells, and the supernatant was adjusted to pH 4.0 by addition of 3N-HCl, passed through a column packed with active carbon to adsorb CCMP on the active carbon. The column was washed with water and then treated with 50 % ethanol containing 1.4 % ammonia to elute the CCMP. The eluate was concentrated under reduced pressure at 50°C to remove excess ammonia, adjusted to pH 8.0 by use of 3N-$NH_4OH$, and then passed through a column packed with Dowex 1 (x 4) formic acid type (100–200 mesh.) to adsorb the CCMP on the resin. The column was washed with water, pre-eluted with a 0.02N-formic acid solution (CCMP and 3′,5′-cyclic adenylic acid were not eluted), and further eluted with a 0.10N-formic acid solution (3′, 5′-cyclic adenylic acid was not eluted and only CCMP was eluted) to obtain a CCMP fraction. This CCMP fraction was adjusted to pH 7.0 with 3N-KOH and then passed through an alumina column packed with neutral aluminum oxide. The resulting effluent, which contained only CCMP, was adjusted to pH 2.0 with 50 % HCl and then passed through a column packed with active carbon to adsorb the CCMP on the active carbon. The column was washed with water and then treated with a 50 % ethanol solution containing 1.4 % of ammonia. The eluate was concentrated under reduced pressure to remove excess ammonia, passed through a column packed with Amberlite IRC-50, H-form to remove ammonia, further concentrated under reduced pressure, charged with acetone and then allowed to stand at 0°C for 20 hours to form crystals of CCMP. The crystals were collected by filtration and dried in vaccum to obtain crystals of CCMP.

The amount of CCMP recovered in the above-mentioned manner from 10 liters of the culture liquor of each strain was as shown in Table 1.

Table 1

| Strain | Amount of CCMP Produced (mg/l) | Recovered (mg) |
|---|---|---|
| Corynebacterium murisepticum No. 7 (ATCC 21374, FERM-P No. 206) | 5 | 21 |
| Arthrobacter 11 (ATCC 21375, FERM-P No. 207) | 5 | 26 |
| Microbacterium No. 205 (ATCC 21376, FERM-P No. 106) | 8 | 34 |

EXAMPLE 2

Arthrobacter 11 (ATCC 21375, FERM-P No. 207) was cultured at 28°C for 16 hours in a medium having a composition of 2 % of glucose, 1 % of polypeptone, 0.7 % of yeast extract and 0.2 % of sodium chloride (pH 7.0to prepare a seed culture. On the other hand, 1 liter of a medium having a composition of 5 % of glucose, 1 % of urea, 1 % of $KH_2PO_4$, 2 % of histidine, 0.2 % of $MgSO_4.7H_2O$, 200 γ/l of biotin, 0.02 % of calcium pantothenate, 0.001 % of folic acid, 0.0005 % of $CoSO_4.7H_2O$, 0.000005 % of $FeSO_4.7H_2O$ and 3 g/l of each of the compounds set forth in Table 2 (pH 8.0, adjusted with 3N-KOH) was charged into a 5 liter-Erlenmeyer flask and sterilized in an autoclave at 115°C for 10 minutes. The above-mentioned seed culture was inoculated to the medium in the flask in a proportion of 10 %, and subjected to shaking culture at 30°C for 80 hours with shaking at 180 r.p.m.

The amount of CCMP produced in each culture liquor at this stage was as shown in Table 2.

Subsequently, each culture liquor was centrifuged to remove the cells, and thereafter the same treatment as in Example 1 were conducted to obtain crystals of CCMP.

The amount of CCMP recovered from 10 liters of each culture liquor was as shown in Table 2.

Table 2

| Compound | Amount of CCMP Produced (mg/l) | Recovered (mg) |
|---|---|---|
| Cytosine | 98 | 382 |
| Cytidine | 99 | 333 |
| 5'-Cytidylic acid | 115 | 415 |
| 2'-Cytidylic acid | 30 | 107 |
| 3'-Cytidylic acid | 45 | 118 |
| Cytidine-5'-diphosphate | 83 | 321 |
| Cytidine-5'-triphosphate | 79 | 245 |
| None | 6 | 12 |

EXAMPLE 3

Each of Corynebacterium murisepticum No. 7 (ATCC 21374, FERM-P No. 206), Arthrobacter 11 (ATCC 21375, FERM-P No. 207) and Microbacterium No. 205 (ATCC 21376, FERM-P No. 106) was cultured in a slant medium having a composition of 0.5 % of $(NH_4)_2SO_4$, 0.5 % of $KH_2PO_4$, 0.5 % of $K_2HPO_4$, 0.05 % of $MgSO_4.7H_2O$, 1 % of casamino acid, 0.5 % of yeast extract, 1 % of glucose and 2 % of agar to prepare a seed culture. On the other hand, 40 ml of a medium having a composition of 5 % of glucose, 0.5 % of urea, 0.5 % of $KH_2PO_4$, 0.5 % of $K_2HPO_4$, 1 % of polypeptone, 0.5 % of yeast extract, 0.5 % of $MgSO_4.7H_2O$, 0.01 % of $ZnSO_4.7H_2O$, and 3 g/l of each of the compounds set forth in Table 3 (pH 8.0, adjusted with 3N-KOH) was charged into a 500 ml-shaking flask and sterilized in an autoclave at 115°C for 10 minutes. The above-mentioned seed culture was inoculated to the medium in the shaking flask, and subjected to shaking culture at 30°C for 70 hours with shaking at 140 r.p.m.

The amount of CCMP produced in each culture liquor at this stage was as shown in Table 3.

Subsequently, each culture liquor was centrifuged to remove the cells, and the same treatments as in Example 1 were conducted to obtain crystals of CCMP.

The amount of CCMP recovered from 10 liters of each culture liquor was as shown in Table 3.

Table 3

| Strain | Compound | Amount of CCMP Produced (mg/l) | Recovered (mg) |
|---|---|---|---|
| C | Cytosine | 63 | 223 |
|   | Cytidine | 78 | 256 |
|   | None | 4 | 10 |
| A | Cytosine | 118 | 327 |
|   | Cytidine | 105 | 336 |
|   | None | 5 | 12 |
| M | Cytosine | 110 | 320 |
|   | Cytidine | 104 | 285 |
|   | None | 6 | 12 |

C: Corynebacterium murisepticum No. 7 (ATCC 21374, FERM-P No. 206)
A: Arthrobacter 11 (ATCC 21375, FERM-P No. 207)
M: Microbacterium No. 205 (ATCC 21376, FERM-P No. 106)

EXAMPLE 4

Microbacterium No. MT-3 (ATCC 21981, FERM-P No. 787) was subjected to shaking culture at 28°C for 16 hours in a medium having a composition of 4 % of waste molasses, 1 % of meat extract, 0.5% of corn steep liquor and 0.1 % of sodium chloride (pH7.0) to prepare a seed culture. On the other hand, 1 liter of a medium having a composition of 5 % of glucose, 1 % of urea, 0.5 % of $KH_2PO_4$, 0.5 % of $K_2HPO_4$, 1 % of meat extract, 0.5 % of corn steep liquor, 1.0 % of $MgSO_4.7H_2O$, 0.01 % of $ZnSO_4.7H_2O$, 0.02 % of $FeCl_2.7H_2O$, 3 g/l of each of the compounds set forth in Table 4 and city water (pH 7.5, adjusted with 3N-KOH) was charged into a 5 liter-Erlenmeyer flask and sterlized in an autoclave at 115°C for 10 minutes. (The said medium contained 1.02 mg/l of $Mn^{++}$ in terms of $MnCl_2.4H_2O$, 112 mg/l of $Fe^{++}$ in terms of $FeCl_2.7H_2O$, and 88 mg/l of $Fe^{+++}$ in terms of $FeCl_3.7H_2O$). The above-mentioned seed culture was inoculated to said medium in a proportion of 10 % and subjected to shaking culture at 30°C for 80 hours with shaking at 180 r.p.m.

The amount of CCMP produced in each culture liquor at this stage was as shown in Table 4.

Subsequently, each culture liquor was centrifuged to remove the cells, and thereafter the same treatments as in Example 1 were conducted to obtain crystals of CCMP.

The amount of CCMP recovered from 10 liters of each culture liquor was as shown in Table 4.

Table 4

| Compound | Amount of CCMP Produced (mg/l) | Recovered (mg) |
| --- | --- | --- |
| Cytosine | 190 | 800 |
| Cytidine | 200 | 791 |
| 5'-Cytidylic acid | 181 | 534 |
| 3'-Cytidylic acid | 170 | 532 |
| None | 7 | 28 |

EXAMPLE 5

Each of the strains set forth in Table 5 was cultured in the same manner as in Example 2 to prepare a seed culture. On the other hand, 1 liter of a medium having a composition of 7.5 % of glucose, 1 % of urea, 1 % of $KH_2PO_4$, 1 % of $K_2PO_4$, 0.5 % of yeast extract, 1 % of polypeptone, 1 % of $MgSO_4.7H_2O$, 0.02 % of $ZnSO_4.7H_2O$ and 3 g/l of each of the compounds set forth in Table 5 (pH 7.5, adjusted with 3N-KOH) was charged into a 5 liter-Erlenmeyer flask and sterilized in an autoclave at 115°C for 12 minutes. The above-mentioned seed culture was inoculated to said medium in a proportion of 10 % and then subjected to shaking culture at 30°C for 80 hours with shaking at 180 r.p.m.

The amount of CCMP produced in each culture liquor at this stage was as shown in Table 5.

Subsequently, each culture liquor was centrifuged to remove the cells, and thereafter the same treatments as in Example 1 were conducted to obtain crystals of CCMP.

The amount of CCMP recovered from 10 liters of each culture liquor was as shown in Table 5.

Table 5

| | Strain | | | |
| --- | --- | --- | --- | --- |
| | C | | M | |
| | Amount of CCMP | | | |
| Compound | Produced (mg/l) | Recovered (mg) | Produced (mg/l) | Recovered (mg) |
| 5'-Cytidylic acid | 110 | 334 | 120 | 256 |
| 3'-Cytidylic acid | 34 | 95 | 45 | 100 |
| 2'-Cytidylic acid | 35 | 90 | 48 | 112 |
| Cytidine-5'-diphosphate | 107 | 287 | 110 | 278 |
| Cytidine-5'-triphosphate | 108 | 280 | 98 | 256 |
| None | 7 | 13 | 8 | 15 |

C: *Corynebacterium murisepticum* No. 7 (ATCC 21374, FERM-P No. 206)
M: Microbacterium No. 205 (ATCC 21375, FERM-P No. 106)

EXAMPLE 6

Microbacterium No. 205 (ATCC 21376, FERM-P No. 106) was cultured in the same manner as in Example 2 to prepare a seed culture. On the other hand, one liter of a medium having a composition of 7.5 % of glucose, 1 % of urea, 0.5 % of $KH_2PO_4$, 0.5 % of $K_2HPO_4$, 0.5 % of glycine, 0.5 % of yeast extract, 1 % of $MgSO_4.7H_2O$, 0.02 % of $ZnSO_4.7H_2O$ and 3 g/l of each of the compounds set forth in Table 8 (pH 7.5, adjusted with 3N-KOH) was charged into a 5 liter-Erlenmeyer flask and sterilized in an autoclave at 115°C for 12 minutes. The above-mentioned seed culture was inoculated to said medium in a proportion of 10 % and then subjected to shaking culture at 30°C for 20 hours with shaking at 180 r.p.m. Subsequently, a 1 % solution of the fluoride, boric acid or borate set forth in Table 6 (which had previously been sterilized in an autoclave at 110°C for 10 minutes) was added to the medium to such a concentration as shown in Table 6, and the shaking culture was further continued at 30°C for 60 hours with shaking at 180 r.p.m.

The amount of CCMP produced in each culture liquor at this stage was as shown in Table 6.

Subsequently, each culture liquor was centrifuged to remove the cells, and thereafter the same treatments as in Example 1 were conducted to obtain crystals of CCMP.

The amount of CCMP recovered from 10 liters of each culture liquor was as shown in Table 6.

Table 6

| Compound | Additive Fluoride, boric acid or borate | Concentration (mg/l) | Amount of CCMP Produced (mg/l) | Recovered (mg) |
| --- | --- | --- | --- | --- |
| Cytosine | Boric acid | 40 | 186 | 611 |
| | Zinc fluoride | 50 | 194 | 638 |
| | None | — | 104 | 290 |
| Cytidine | Boric acid | 40 | 184 | 680 |
| | Zinc fluoride | 50 | 187 | 622 |
| | None | — | 84 | 257 |
| 5'-Cytidylic acid | Sodium borate | 100 | 197 | 685 |
| | Cobalt fluoride | 5 | 184 | 635 |
| | None | — | 94 | 276 |
| 3'-Cytidylic acid | Sodium borate | 100 | 53 | 125 |
| | Cobalt fluoride | 5 | 74 | 219 |
| | None | — | 34 | 96 |
| 2'-Cytidylic acid | Potassium borate | 200 | 50 | 139 |
| | Potassium fluoride | 10 | 64 | 205 |
| | None | — | 28 | 80 |
| Cytidine-5'-diphosphate | Zinc borate | 100 | 188 | 649 |
| | Sodium fluoride | 50 | 184 | 610 |
| | None | — | 95 | 287 |
| Cytidine-5'-triphosphate | Ammonium borate | 100 | 181 | 640 |
| | Ferric fluoride | 100 | 188 | 637 |
| | None | — | 90 | 297 |

EXAMPLE 7

Each of Arthrobacter 11 (ATCC 21375, FERM-P No. 207) and *Corynebacterium murisepticum* No. 7 (ATCC 21374, FERM-P No. 206) was cultured in the same manner as in Example 2 to prepare a seed culture. On the other hand, one liter of a medium having a composition of 5 % of glucose, 1 % of urea, 1 % of $KH_2PO_4$, 1 % of $K_2HPO_4$, 0.5 % of yeast extract, 1 % of polypeptone, 1 % of $MgSO_4.7H_2O$, 0.02 % of $ZnSO_4.7H_2O$ and 3 g/l of each of the compounds set forth in Tables 7 and 8, and containing each of the fluorides, boric acid and borates set forth in Tables 7 and 8 at such concentration as shown in said Tables (pH 7.5, adjusted with 3N-KOH) was charged into a 5 liter-Erlenmeyer flask and sterilized in an autoclave at 115°C for 12 minutes. The above-mentioned seed culture was inoculated to said medium in a proportion of 10 % and then subjected to shaking culture at 30°C for 80 hours with shaking at 180 r.p.m.

The amount of CCMP produced in each culture liquor at this stage was as shown in Tables 7 and 8.

Subsequently, each culture liquor was centrifuged to remove the cells, and thereafter the same treatments as in Example 1 were conducted to obtain crystals of CCMP.

The amount of CCMP recovered from 10 liters of each culture liquor was as shown in Tables 7 and 8.

Table 7

Strain: Arthrobacter 11 (ATCC 21375, FERM-P No. 207)

| Compound | Additive Fluoride, boric acid or borate | Concentration (mg/l) | Amount of CCMP Produced (mg/l) | Recovered (mg) |
|---|---|---|---|---|
| Cytosine | Sodium fluoride | 30 | 165 | 518 |
|  | Boric acid | 20 | 134 | 386 |
|  | None | — | 94 | 274 |
| Cytidine | Posassium fluoride | 10 | 168 | 489 |
|  | Sodium borate | 40 | 128 | 350 |
|  | None | — | 88 | 251 |
| 5'-Cytidylic acid | Zinc fluoride | 100 | 158 | 478 |
|  | Sodium borate | 40 | 140 | 412 |
|  | None | — | 87 | 267 |
| 3'-Cytidylic acid | Zinc fluoride | 100 | 60 | 197 |
|  | Potassium borate | 100 | 42 | 116 |
|  | None | — | 38 | 79 |
| 2'-Cytidylic acid | Cobalt fluoride | 5 | 51 | 178 |
|  | Potassium borate | 100 | 40 | 107 |
|  | None | — | 24 | 58 |
| Cytidine-5'-di-phosphate | Ammonium fluoride | 100 | 158 | 405 |
|  | Cobalt borate | 2 | 135 | 370 |
|  | None | — | 74 | 217 |
| Cytidine-5'-tri-phosphate | Ammonium fluoride | 100 | 161 | 478 |
|  | Zinc borate | 50 | 129 | 381 |
|  | None | — | 88 | 235 |

Table 8

Strain: Corynebacterium murisepticum No. 7 (ATCC 21376, FERM-P No. 206)

| Compound | Additive Fluoride, boric acid or borate | Concentration (mg/l) | Amount of CCMP Produced (mg/l) | Recovered (mg) |
|---|---|---|---|---|
| Cytosine | Ammonium fluoride | 100 | 98 | 325 |
|  | Zinc borate | 100 | 134 | 427 |
|  | None | — | 36 | 97 |
| Cytidine | Sodium fluoride | 50 | 87 | 286 |
|  | Zinc borate | 100 | 128 | 385 |
|  | None | — | 35 | 94 |
| 5'-Cytidylic acid | Potassium fluoride | 30 | 86 | 271 |
|  | Cobalt borate | 20 | 138 | 416 |
|  | None | — | 37 | 98 |
| 3'-Cytidylic acid | Zinc fluoride | 50 | 34 | 117 |
|  | Cobalt borate | 20 | 42 | 118 |
|  | None | — | 25 | 74 |
| 2'-Cytidylic acid | Zinc fluoride | 50 | 30 | 98 |
|  | Boric acid | 30 | 38 | 120 |
|  | None | — | 24 | 70 |
| Cytidine-5'-di-phosphate | Cobalt fluoride | 10 | 76 | 287 |
|  | Potassium borate | 100 | 135 | 420 |
|  | None | — | 38 | 86 |
| Cytidine-5'-tri-phosphate | Cobalt fluoride | 10 | 80 | 258 |
|  | Sodium borate | 100 | 128 | 382 |
|  | None | — | 40 | 106 |

EXAMPLE 8

Using Microbacterium No. 205 (ATCC 21376, FERM-P No. 106), crystals of CCMP were obtained in the same manner as in Example 6, except that the compounds set forth in Table 6 were not used, and the fluorides, boric acid and borates set forth in Table 6 were replaced by those set forth in Table 9 and used at such concentrations as shown in Table 9.

The amount of CCMP produced in each culture liquor and the amount of CCMP crystals recovered from 10 liters of each culture liquor were as shown in Table 9.

Table 9

| Fluoride, boric acid or borate | Concentration (mg/l) | Amount of CCMP Produced (mg/l) | Recovered (mg) |
|---|---|---|---|
| Boric acid | 40 | 36 | 97 |
| Sodium borate | 100 | 28 | 70 |
| Potassium borate | 200 | 27 | 68 |
| Zinc borate | 100 | 28 | 65 |
| Ammonium borate | 100 | 21 | 57 |
| Zinc fluoride | 50 | 30 | 94 |
| Cobalt fluoride | 5 | 28 | 80 |
| Potassium fluoride | 10 | 33 | 96 |
| Sodium fluoride | 50 | 36 | 88 |
| Ferric fluoride | 100 | 28 | 77 |
| None | — | 10 | 25 |

EXAMPLE 9

Using Arthrobacter 11 (ATCC 21375, FERM-P No. 207) and Corynebacterium murisepticum No. 7 (ATCC 21374, FERM-P No. 206), crystals of CCMP were obtained in the same manner as in Example 7, except that the compounds set forth in Tables 7 and 8 were not used, and the fluorides, boric acid and borates set forth in Tables 7 and 8 were replaced by those set forth in Tables 10 and 11 and used at such concentrations as shown in Tables 10 and 11.

The amount of CCMP produced in each culture liquor and the amount of CCMP crystals recovered from 10 liters of each culture liquor were as shown in Tables 10 and 11.

Table 10

Strain: Arthrobacter 11 (ATCC 21375, FERM-P No. 207)

| Fluoride, boric acid or borate | Concentration (mg/l) | Amount of CCMP Produced (mg/l) | Recovered (mg) |
|---|---|---|---|
| Sodium fluoride | 30 | 28 | 87 |
| Potassium fluoride | 10 | 25 | 65 |
| Zinc fluoride | 100 | 33 | 96 |
| Cobalt fluoride | 5 | 27 | 71 |
| Ammonium fluoride | 100 | 30 | 81 |
| Boric acid | 20 | 27 | 74 |
| Sodium borate | 40 | 25 | 74 |
| Potassium borate | 100 | 20 | 81 |
| Cobalt borate | 2 | 25 | 74 |
| Zinc borate | 50 | 26 | 71 |
| None | — | 6 | 18 |

Table 11

Strain: Corynebacterium murisepticum No. 7 (ATCC 21374, FERM-P No. 206)

| Fluoride, boric Acid or borate | Concentration (mg/l) | Amount of CCMP Produced (mg/l) | Recovered (mg) |
|---|---|---|---|
| Ammonium fluoride | 100 | 18 | 58 |
| Sodium fluoride | 50 | 15 | 47 |
| Potassium fluoride | 30 | 17 | 48 |
| Zinc fluoride | 50 | 18 | 52 |
| Cobalt fluoride | 10 | 15 | 45 |
| Zinc borate | 100 | 28 | 84 |
| Cobalt borate | 20 | 21 | 67 |
| Boric acid | 30 | 18 | 51 |
| Potassium borate | 100 | 18 | 45 |
| Sodium borate | 100 | 20 | 57 |
| None | — | 7 | 20 |

EXAMPLE 10

Each of the strains set forth in Table 12 was cultured at 28°C for 16 hours in a medium having a composition of 2 % of glucose, 1 % of polypeptone, 0.7 % of yeast extract and 0.2 % of sodium chloride (pH 7.0) to prepare a seed culture. On the other hand, 1 liter of a medium having a composition of 5 % of glucose, 1 % of urea, 1 % of $KH_2PO_4$, 1 % of polypeptone, 0.5 % of yeast extract, 0.2 % of $MgSO_4 \cdot 7H_2O$, 0.01 % of $ZnSO_4 \cdot 7H_2O$ and 3 g/l of each of the compounds set forth in Table 12 (pH 8.0 adjusted with 3N-KOH) was charged into a 5 liter-Erlenmeyer flask and sterilized in an autoclave at 115°C for 10 minutes. The above-mentioned seed culture was inoculated to the said medium and subjected to shaking culture at 30°C for 20 hours with shaking at 180 r.p.m.

The amount of CCMP produced in each culture liquor at this stage was as shown in Table 12.

Subsequently, 1 liter of each culture liquor was centrifuged to remove the cells, and the supernatant was adjusted to pH 4.0 by use of concentrated hydrochloric acid, and then adsorbed on active carbon. The active carbon was washed with water and then treated with a 50 % aqueous ethanol solution containing 1.4 % of ammonia to elute CCMP. The eluate was concentrated under reduced pressure to 100 ml, and the resulting concentrate was adjusted to pH 8.0 by use of concentrated $NH_4OH$, and then passed through a column (3 cm × 50 cm) packed with Dowex 1 (× 4) formate type resin (100–200 mesh.) to adsorb the CCMP on the resin column. Subsequently, the column was washed with water, pre-eluted with a 0.02N-formic acid solution, and then treated with a 0.1N-formic acid solution to elute the CCMP, while fractionating the eluate to fractions of each 50 ml in volume (3′,5′-cyclic adenylic acid was not eluted). Among these fractions, those having absorptions at 280 mμ were subjected to indole reaction [Ceriotti, G., J. Biol. Chem., 198, 297 (1952) and 214, 59 (1955)] and orcinol reaction on ribose [Brown, A. H., Arch. Biochem., 11, 269 (1946)], and fractions, which were negative to the former reaction and positive to the latter reaction, were collected to obtain a fraction containing only CCMP.

The CCMP fraction was adjusted to pH 7.0 with 3N-KOH and passed through an alumina column packed with neutral aluminum oxide. The effluent was adjusted to pH 2.0 with 50 % HCl and passed through a column packed with active carbon to adsorb the CCMP on the active carbon. The active carbon column was washed with water and then treated with a 50 % ethanol solution containing 1.4 % of ammonia to elute the CCMP. The eluate was concentrated under reduced pressure to remove excess ammonia, passed through a column packed with Amberlite IRC-50, $H^+$-form, to remove the ammonia, further concentrated under reduced pressure, and then freeze-dried to obtain CCMP crystals in such amount as shown in Table 12.

Table 12

| Compound | Strain C Amount of CCMP Produced (g/l) | Strain C Amount of CCMP Recovered (g) | Strain M Amount of CCMP Produced (g/l) | Strain M Amount of CCMP Recovered (g) |
|---|---|---|---|---|
| Uracil | 2.34 | 0.72 | 3.46 | 1.21 |
| Uridine | 2.54 | 0.84 | 3.34 | 1.12 |
| 5′-Uridylic acid | 2.67 | 0.82 | 3.38 | 1.09 |
| 3′-Uridylic acid | 0.98 | 0.79 | 1.24 | 0.42 |
| 2′-Uridylic acid | 0.34 | 0.12 | 1.10 | 0.32 |
| Uridine-5′-diphosphate | 2.84 | 0.83 | 3.28 | 1.00 |
| Uridine-5′-triphosphate | 2.87 | 0.84 | 3.45 | 1.14 |
| Orotic acid | 1.22 | 0.42 | 1.54 | 0.51 |
| Orotidine | 1.12 | 0.33 | 1.64 | 0.53 |
| Orotidine-5′-monophosphate | 1.41 | 0.32 | 1.82 | 0.65 |
| None | 0.01 | 0.003 | 0.03 | 0.006 |

C: *Corynebacterium murisepticum* No. 7 (ATCC 21374, FERM-P No. 206)
M: *Microbacterium* No. 205-CM7 (ATCC 21979, FERM-P No. 1557)

EXAMPLE 11

Each of the strains set forth in Table 13 was cultured in a slant medium having a composition of 0.5 % of $(NH_4)_2SO_4$, 0.5 % of $KH_2PO_4$, 0.5 % of $K_2HPO_4$, 0.05 % of $MgSO_4 \cdot 7H_2O$, 1 % of casamino acid, 0.5 % of yeast extract, 1 % of glucose and 2 % of agar to prepare a seed culture. On the other hand, 40 ml of a medium having a composition of 5 % of glucose, 0.5 % of urea, 0.5 % of $KH_2PO_4$, 0.5 % of $K_2HPO_4$, 1 % of polypeptone, 0.5 % of yeast extract, 0.5 % of $MgSO_4 \cdot 7H_2O$, 0.01 % of $ZnSO_4 \cdot 7H_2O$ and 3 g/l of each of the compounds set forth in Table 13 (pH 8.0, adjusted with 3N-KOH) was charged into a 500 ml shaking flask and sterilized in an autocalve at 115°C for 10 minutes. The above-mentioned seed culture was inoculated to said medium and subjected to shaking culture at 30°C for 70 hours with shaking at 140 r.p.m.

The amount of CCMP produced in each culture liquor at this stage was as shown in Table 13.

Subsequently, each culture liquor was centrifuged to remove the cells, and thereafter the same treatments as in Example 10 were conducted to obtain crystals of CCMP.

The amount of CCMP recovered from 1 liter of each culture liquor was as shown in Table 13.

Table 13

| Strain | Compound | Amount of CCMP Produced (g/l) | Amount of CCMP Recovered (g) |
|---|---|---|---|
| C | Uracil | 2.27 | 0.73 |
| C | Uridine | 2.54 | 0.81 |
| C | None | 0.01 | 0.002 |
| A | Uracil | 1.14 | 0.28 |
| A | Uridine | 1.32 | 0.42 |
| A | None | 0.006 | 0.001 |
| M | Uracil | 2.47 | 0.85 |
| M | Uridine | 2.68 | 0.94 |
| M | None | 0.03 | 0.01 |

C: *Corynebacterium murisepticum* No. 7 (ATCC 21374, FERM-P No. 206)
A: *Arthrobacter* 11 (ATCC 21375, FERM-P No. 207)
M: *Microbacterium* No. 205 (ATCC 21376, FERM-P No. 106)

EXAMPLE 12

Each of the strains set forth in Table 14 was subjected to shaking culture at 28°C for 16 hours in a medium having a composition of 4 % of waste molasses, 1 % of meat extract, 0.5 % of corn steep liquor and 0.1 % of sodium chloride (pH 7.0) to prepare a seed culture. On the other hand, 1 liter of a medium having a composition of 5 % of glucose, 1 % of urea, 0.5 % of KH$_2$PO$_4$, 0.5 % of K$_2$HPO$_4$, 1 % of meat extract, 0.5 % of corn steep liquor, 1.0 % of MgSO$_4$.7H$_2$O, 0.01 % of ZnSO$_4$.7H$_2$O, 0.02 % of FeCl$_2$.7H$_2$O, 3 g/l of each of the compounds set forth in Table 14 and city water (pH 7.5, adjusted with 3N-KOH) was charged into a 5 liter-Erlenmeyer flask and sterilized in an autoclave at 115°C for 10 minutes. (The medium contained 1.02 mg/l of Mn$^{++}$ in terms of MnCl$_2$.4H$_2$O, 112 mg/l of Fe$^{++}$ in terms of FeCl$_2$.7H$_2$O and 86 mg/l of Fe$^{+++}$ in terms of FeCl$_3$.7H$_2$O). The above-mentioned seed culture was inoculated to said medium in a proportion of 10 % and subjected to shaking culture at 30°C for 80 hours with shaking at 180 r.p.m.

The amount of CCMP produced in each culture liquor at this stage was as shown in Table 14.

Subsequently, each culture liquor was centrifuged to remove the cells, and thereafter the same treatments as in Example 10 were conducted to obtain crystals of CCMP.

The amount of CCMP recovered from 1 liter of each culture liquor was as shown in Table 14.

Table 14

| Compound | Strain M Amount of CCMP | | Strain C Amount of CCMP | | Strain A Amount of CCMP | |
|---|---|---|---|---|---|---|
| | Produced (g/l) | Recovered (g) | Produced (g/l) | Recovered (g) | Produced (g/l) | Recovered (g) |
| Uracil | 2.84 | 0.82 | 3.24 | 1.22 | 2.43 | 0.83 |
| Uridine | 2.76 | 0.63 | 3.33 | 1.26 | 2.35 | 0.77 |
| 5'-Uridylic acid | 2.86 | 0.81 | 3.21 | 1.12 | 2.44 | 0.82 |
| 3'-Uridylic acid | 1.22 | 0.45 | 1.58 | 0.54 | 1.35 | 0.40 |
| Orotic acid | 0.78 | 0.24 | 0.98 | 0.32 | 0.85 | 0.25 |
| Orotidine | 0.87 | 0.28 | 1.13 | 0.38 | 0.68 | 0.23 |
| None | 0.01 | 0.002 | 0.02 | 0.003 | 0.02 | 0.003 |

M: Microbacterium No. MT-3 (ATCC 21981, FERM-P No. 787)
C: Corynebacterium No. MT-11 (ATCC 31019, FERM-P No. 2384)
A: Arthrobacter No. MT-12 (ATCC 31020, FERM-P No. 2482)

EXAMPLE 13

Each of the strains set forth in Table 15 was cultured in the same manner as in Example 10 to prepare a seed culture. On the other hand, 1 liter of a medium having a composition of 5 % of glucose, 1 % of urea, 1 % of KH$_2$PO$_4$, 1 % of K$_2$HPO$_4$, 0.5 % of yeast extract, 1 % of polypeptone, 1 % of MgSO$_4$. 7H$_2$O, 0.03 % of ZnSO$_4$.7H$_2$O and 3 g/l of each of the compounds set forth in Table 15 (pH 7.5, adjusted with 3N-KOH) was charged into a 5 liter-Erlenmeyer flask and sterilized in an autocalve at 115°C for 12 minutes. The above-mentioned seed culture was inoculated to said medium in a proportion of 10 % and subjected to shaking culture at 30°C for 80 hours with shaking at 180 r.p.m.

The amount of CCMP produced in each culture liquor at this stage was as shown in Table 15.

Subsequently, each culture liquor was centrifuged to remove the cells, and thereafter, the same treatments as in Example 10 were conducted to obtain crystals of CCMP.

The amount of CCMP recovered from 1 liter of each culture liquor was as shown in Table 15.

Table 15

| Compound | Strain A Amount of CCMP | | Strain M Amount of CCMP | |
|---|---|---|---|---|
| | Produced (g/l) | Recovered (g) | Produced (g/l) | Recovered (g) |
| 5'-Uridylic acid | 2.77 | 0.92 | 2.84 | 0.93 |
| 3'-Uridylic acid | 0.98 | 0.32 | 0.77 | 0.23 |
| 2'-Uridylic acid | 0.97 | 0.28 | 0.84 | 0.24 |
| Uridine-5'-diphosphate | 2.54 | 0.73 | 2.23 | 0.72 |
| Uridine-5'-triphosphate | 2.47 | 0.68 | 2.64 | 0.86 |
| Orotic acid | 1.17 | 0.28 | 0.97 | 0.35 |
| Orotidine | 1.22 | 0.43 | 0.96 | 0.29 |
| Orotidine-2'-monophosphate | 1.23 | 0.32 | 1.24 | 0.45 |
| Orotidine-3'-monophosphate | 1.44 | 0.45 | 1.32 | 0.43 |
| Orotidine-5'-monophosphate | 1.47 | 0.48 | 1.22 | 0.44 |
| Orotidine-5'-diphosphate | 1.74 | 0.67 | 1.34 | 0.45 |
| Orotidine-5'-triphosphate | 1.77 | 0.81 | 1.22 | 0.34 |
| None | 0.05 | 0.002 | 0.01 | 0.003 |

A: Arthrobacter 11 (ATCC 21375, FERM-P No. 207)
M: Microbacterium No. 205 (ATCC 21376, FERM-P No. 106)

EXAMPLE 14

Microbacterium No. 205 (ATCC 21376, FERM-P No. 106) was cultured in the same manner as in Example 10 to prepare a seed culture. On the other hand, one liter of a medium having a composition of 7.5 % of glucose, 1 % of urea, 0.5 % of KH$_2$PO$_4$, 0.5 % of K$_2$HPO$_4$, 0.5 % of glycine, 0.5 % of yeast extract, 1 % of MgSO$_4$.7H$_2$O, 0.02 % of ZnSO$_4$.7H$_2$O and 3 g/l of each of the compounds set forth in Table 16 (pH 7.5, adjusted with 3N-KOH) was charged into a 5 liter-Erlenmeyer flask and sterilized in an autocalve at 115°C for 12 minutes. The above-mentioned seed culture was inoculated to said medium in a proportion of 10 % and subjected to shaking culture at 28°C for 24 hours with shaking at 190 r.p.m. Subsequently, a 1 % solution of the fluoride, boric acid or borate set forth in Table 16 (which had previously been sterilized in an autoclave at 110°C for 10 minutes) was added to the medium to such a concentration as shown in Table 16, and the shaking culture was further continued at 28°C for 70 hours with shaking at 190 r.p.m.

The amount of CCMP produced in each culture liquor at this stage was as shown in Table 16.

Subsequently, each culture liquor was centrifuged to remove the cells, and thereafter the same treaments as in Example 10 were conducted to obtain crystals of CCMP.

The amount of CCMP crystals recovered from 1 liter of each culture liquor was as shown in Table 16.

Table 16

| Compound | Additive | | Amount of CCMP | |
|---|---|---|---|---|
| | Fluoride, boric acid or borate | Concentration (mg/l) | Produced (g/l) | Recovered (g) |
| Uracil | Sodium fluoride | 50 | 3.43 | 1.12 |
| | Sodium borate | 60 | 3.66 | 1.23 |
| | None | — | 2.45 | 0.82 |
| Uridine | Sodium fluoride | 50 | 3.76 | 1.23 |
| | Sodium borate | 60 | 3.87 | 1.28 |
| | None | — | 2.44 | 0.89 |
| 5'-Uridylic | Sodium | | | |

Table 16-continued

| Compound | Additive Fluoride, boric acid or borate | Concentration (mg/l) | Amount of CCMP Produced (g/l) | Recovered (g) |
|---|---|---|---|---|
| acid | fluoride | 50 | 3.67 | 1.33 |
| | Sodium borate | 60 | 3.46 | 1.19 |
| | None | — | 2.56 | 0.81 |
| 3'-Uridylic acid | Sodium fluoride | 50 | 3.67 | 1.23 |
| | Sodium borate | 60 | 3.88 | 1.33 |
| | None | — | 0.94 | 0.34 |
| 2'-Uridylic acid | Sodium fluoride | 50 | 2.47 | 0.84 |
| | Sodium borate | 60 | 2.49 | 0.81 |
| | None | — | 0.97 | 0.32 |
| Uridine-5'-diphosphate | Sodium fluoride | 50 | 3.45 | 1.24 |
| | Sodium borate | 40 | 3.37 | 1.23 |
| | None | — | 2.67 | 0.84 |
| Uridine-5'-triphosphate | Sodium fluoride | 50 | 3.89 | 1.25 |
| | Boric acid | 40 | 3.81 | 1.42 |
| | None | — | 2.53 | 0.75 |
| Orotic acid | Zinc fluoride | 100 | 2.45 | 0.84 |
| | Ammonium borate | 200 | 2.31 | 0.70 |
| | None | — | 1.12 | 0.35 |
| Orotidine | Zinc fluoride | 100 | 2.22 | 0.72 |
| | Ammonium borate | 200 | 2.53 | 0.86 |
| | None | — | 1.12 | 0.34 |
| Orotidine-2'-monophosphate | Cobalt fluoride | 5 | 2.05 | 0.72 |
| | Zinc borate | 100 | 1.97 | 0.58 |
| | None | — | 0.84 | 0.24 |
| Orotidine-3'-monophosphate | Cobalt fluoride | 5 | 2.34 | 0.72 |
| | Zinc borate | 100 | 2.50 | 0.83 |
| | None | — | 0.77 | 0.23 |
| Orotidine-5'-monophosphate | Cobalt fluoride | 5 | 2.57 | 0.83 |
| | Zinc borate | 100 | 2.67 | 0.89 |
| | None | — | 0.72 | 0.31 |
| Orotidine-5'-diphosphate | Potassium fluoride | 70 | 3.77 | 1.23 |
| | Zinc borate | 100 | 3.65 | 1.33 |
| | None | — | 2.70 | 0.94 |
| Orotidine-5'-triphosphate | Potassium fluoride | 70 | 3.77 | 1.22 |
| | Zinc borate | 100 | 3.82 | 1.32 |
| | None | — | 2.74 | 0.87 |

EXAMPLE 15

Each of Arthrobacter 11 (ATCC 21375, FERM-P No. 207) and *Corynebacterium murisepticum* No. 7 (ATCC 21374, FERM-P No. 206) was precultured in the same manner as in Example 10 to prepare a seed culture. On the other hand, 1 liter of a medium having a composition of 5 % of glucose, 1 % of urea, 1 % of $KH_2PO_4$, 1 % of $K_2HPO_4$, 0.5 % of yeast extract, 1 % of polypeptone, 1 % of $MgSO_4.7H_2O$, 0.02 % of $ZnSO_4.7H_2O$ and 3 g/l of each of the compounds set forth in Tables 17 and 18 and containing each of the fluorides, boric acid and borates set forth in Tables 17 and 18 at such concentration as shown in said Tables (pH 7.5, adjusted with 3N-KOH) was charged into a 5 liter-Erlenmeyer flask and sterilized in an autoclave at 115°C for 12 minutes. The above-mentioned seed culture was inoculated to said medium in a proportion of 1 % and subjected to shaking culture at 30°C for 80 hours with shaking at 180 r.p.m.

The amount of CCMP produced in the culture liquor at this stage was as shown in Tables 17 and 18.

Subsequently, each culture liquid was centrifuged to remove the cells, and thereafter the same treatments as in Example 10 were conducted to obtain crystals of CCMP.

The amount of CCMP recovered from 1 liter of each culture liquor was as shown in Tables 17 and 18.

Table 17

Strain: Arthrobacter 11 (ATCC 21375, FERM-P No. 207)

| Compound | Additive Fluoride, boric acid or borate | Concentration (mg/l) | Amount of CCMP Produced (g/l) | Recovered (g) |
|---|---|---|---|---|
| Uracil | Zinc fluoride | 50 | 3.74 | 1.25 |
| | Zinc borate | 100 | 3.72 | 1.32 |
| | None | — | 2.63 | 0.82 |
| Uridine | Zinc fluoride | 50 | 3.77 | 1.23 |
| | None | — | 2.38 | 0.82 |
| 5'-Uridylic acid | Sodium fluoride | 30 | 3.88 | 1.32 |
| | Zinc borate | 100 | 3.73 | 1.28 |
| | None | — | 2.84 | 0.95 |
| 3'-Uridylic acid | Sodium fluoride | 30 | 2.37 | 0.71 |
| | Sodium borate | 100 | 2.68 | 0.93 |
| | None | — | 1.24 | 0.39 |
| 2'-Uridylic acid | Sodium fluoride | 30 | 2.82 | 0.98 |
| | None | — | 0.93 | 0.32 |
| Uridine-5'-diphosphate | Potassium fluoride | 6 | 3.24 | 1.24 |
| | None | — | 2.27 | 0.73 |
| Uridine-5'-triphosphate | Potassium fluoride | 6 | 3.66 | 1.24 |
| | Cobalt borate | 5 | 3.27 | 1.23 |
| | None | — | 2.46 | 0.79 |
| Orotic acid | Ammonium fluoride | 40 | 2.33 | 0.72 |
| | None | — | 1.22 | 0.45 |
| Orotidine | Ammonium fluoride | 40 | 2.22 | 0.72 |
| | Boric acid | 30 | 2.43 | 0.82 |
| | None | — | 1.23 | 0.43 |
| Orotidine-2'-monophosphate | Ammonium fluoride | 40 | 1.84 | 0.60 |
| | None | — | 0.95 | 0.32 |
| Orotidine-3'-monophosphate | Ammonium fluoride | 40 | 1.76 | 0.53 |
| | Boric acid | 30 | 1.88 | 0.66 |
| | None | — | 0.86 | 0.25 |
| Orotidine-5'-monophosphate | Ammonium fluoride | 40 | 1.97 | 0.66 |
| | Boric acid | 30 | 1.97 | 0.73 |
| | None | — | 0.65 | 0.22 |
| Orotidine-5'-diphosphate | Ammonium fluoride | 40 | 1.85 | 0.66 |
| | None | — | 0.77 | 0.24 |
| Orotidine-5'-triphosphate | Ammonium fluoride | 40 | 1.98 | 0.73 |
| | None | — | 0.76 | 0.24 |

Table 18

Strain: *Corynebacterium murisepticum* No. 7 (ATCC 21374, FERM-P No. 206)

| Compound | Additive Fluoride, boric acid or borate | Concentration (mg/l) | Amount of CCMP Produced (g/l) | Recovered (g) |
|---|---|---|---|---|
| Uracil | Potassium fluoride | 20 | 3.37 | 1.10 |
| | Boric acid | 20 | 3.67 | 1.23 |
| | None | — | 2.67 | 0.84 |
| Uridine | Potassium fluoride | 20 | 3.68 | 1.21 |
| | Cobalt borate | 30 | 3.55 | 1.23 |
| | None | — | 2.67 | 0.83 |
| 5'-Uridylic acid | Potassium fluoride | 20 | 3.77 | 1.24 |
| | Cobalt borate | 30 | 3.86 | 1.22 |
| | None | — | 2.45 | 0.88 |
| 3'-Uridylic acid | Ammonium fluoride | 100 | 2.45 | 0.75 |
| | None | — | 1.56 | 0.34 |
| 2'-Uridylic acid | Sodium borate | 50 | 2.45 | 0.83 |
| | None | — | 1.22 | 0.43 |
| Uridine-5'-diphosphate | Sodium borate | 50 | 3.78 | 1.25 |
| | None | — | 2.65 | 0.87 |
| Uridine-5'-triphosphate | Ammonium fluoride | 100 | 3.88 | 1.22 |
| | None | — | 2.44 | 0.83 |
| Orotic acid | Sodium | | | |

Table 18-continued

Strain: *Corynebacterium murisepticum* No. 7
(ATCC 21374, FERM-P No. 206)

| Compound | Additive Fluoride, boric acid or borate | Concentration (mg/l) | Amount of CCMP Produced (g/l) | Recovered (g) |
|---|---|---|---|---|
| | fluoride | 30 | 2.56 | 0.72 |
| | None | — | 1.12 | 0.33 |
| Orotidine | Sodium fluoride | 30 | 2.88 | 0.79 |
| | Potassium borate | 100 | 2.78 | 0.84 |
| | None | — | 1.13 | 0.34 |
| Orotidine-2'-monophosphate | Potassium borate | 100 | 2.87 | 0.89 |
| | None | — | 0.98 | 0.28 |
| Orotidine-3'-monophosphate | Sodium fluoride | 30 | 2.65 | 0.81 |
| | None | — | 1.12 | 0.25 |
| Orotidine-5'-monophosphate | Sodium fluoride | 30 | 2.89 | 0.87 |
| | Potassium borate | 100 | 3.34 | 1.12 |
| | None | — | 2.23 | 0.74 |
| Orotidine-5'-diphosphate | Zinc fluoride | 60 | 3.34 | 1.12 |
| | None | — | 2.23 | 0.74 |
| Orotidine-5'-triphosphate | Zinc fluoride | 60 | 3.47 | 1.24 |
| | Potassium borate | 100 | 3.23 | 1.10 |
| | None | — | 2.44 | 0.77 |

What is Claimed is:

1. A process for producing cyclic-3', 5'-cytidylic acid by fermentation, comprising culturing a microorganism belonging to the genus Corynebacterium, Arthrobacter or Microbacterium and having an ability of producing cyclic-3', 5'-cytidylic acid in a medium containing a carbon source, a nitrogen source and inorganic nutrients under aerobic conditions at a pH of 5 to 9 at a temperature of 20° to 40°C for a period until cyclic-3', 5'-cytidylic acid is produced and accumulated in the medium and isolating said cyclic-3', 5'-cytidylic acid.

2. A process according to claim 1, wherein the cyclic-3',5'-cytidylic acid is recovered by adsorption method or precipitation method or a combination of said two methods.

3. A process according to claim 1, wherein the microorganism is a strain belonging to the species of *Corynebacterium murisepticum*, Arthrobacter 11 or Microbacterium 205.

4. A process according to claim 3, wherein the microorganism is a strain selected from the group consisting of *Corynebacterium murisepticum* No. 7 (ATCC 21374, FERM-P No. 206), Corynebacterium No. MT-11 (ATCC 31019, FERM-P No. 2384), Arthrobacter 11 (ATCC 21375, FERM-P No. 207), Arthrobacter No. MT-12 (ATCC 31020, FERM-P No. 2482), Microbacterium No. 205 (ATCC 21376, FERM-P No. 106), Microbacterium No. 205-CN7 (ATCC 21979, FERM-P No. 1557) and Microbacterium No. MT-3 (ATCC 21981, FERM-P No. 787).

5. A process according to claim 1, wherein the medium is incorporated with at least one member selected from the group consisting of cytosine, uracil and orotic acid, ribosides having said compounds as bases, and ribotides of said compounds.

6. A process according to claim 1, wherein the medium is incorporated with at least one member selected from the group consisting of fluorides, boric acid and borates.

7. A process according to claim 5, wherein the medium is incorporated with at least one member selected from the group consisting of fluorides, boric acid and borates.

8. A process according to claim 5, wherein the amount of the cytosine, uracil or orotic acid, a riboside having said compound as a base, or a ribotide of said compound in the medium is 0.05 to 2 % (W/V).

9. A process according to claim 6, wherein the amount of the fluoride, boric acid or borate in the medium is 0.1 to 500 mg/l.

10. A process according to claim 7, wherein the amount of the fluoride, boric acid or borate in the medium is 0.1 to 500 mg/l.

11. A process according to claim 1, wherein the cultivation is effected with shaking, stirring or aeration.

12. A process according to claim 1, wherein the cultivation is effected for 10 to 160 hours.

13. A process according to claim 1, wherein the microorganism is precultured in a medium containing a carbon source, a nitrogen source and inorganic nutrients at a pH of 5 to 9 at a temperature of 20° to 40°C, and the resulting seed culture is incorporated with at least one member selected from the group consisting of cytosine, uracil and orotic acid, ribosides having said compounds as bases, and ribotides of said compounds, and then further subjected to post-culture.

14. A process according to claim 13, wherein the preculture is effected for 6 to 20 hours, and the post-culture is effected for 4 to 140 hours.

15. A process according to claim 1, wherein the medium is incorporated with vitamins.

16. A process according to claim 1, wherein the medium is incorporated with a growth inhibitor for cyclic-3',5'-nucleotide phosphodiesterase.

17. A process according to claim 1, wherein the cultivation is effected under such conditions that at the growth stage of cyclic-3',5'-cytidylic acid, the pressure of oxygen present in the culture liquor is controlled to 0.1 to 0.6 atm. and the pressure of carbon dioxide present in the culture liquor to less than 0.08 atm., while at the production stage of cyclic 3',5'-cytidylic acid, the pressure of oxygen present in the culture liquor is controlled to 0.2 to 0.8 atm. and the pressure of carbon dioxide present in the culture liquor to less than 0.05.

* * * * *